US006649115B2

(12) United States Patent
Weiss et al.

(10) Patent No.: US 6,649,115 B2
(45) Date of Patent: Nov. 18, 2003

(54) METHOD OF MANUFACTURING INTERCONNECTION COMPONENTS WITH INTEGRAL CONDUCTIVE ELASTOMERIC SHEET MATERIAL

(75) Inventors: Roger E. Weiss, Foxboro, MA (US); Everett F. Simons, Mansfield, MA (US)

(73) Assignee: Paricon Technologies Corporation, Fall River, MA (US)

( * ) Notice: Subject to any disclaimer, the term of this patent is extended or adjusted under 35 U.S.C. 154(b) by 0 days.

(21) Appl. No.: 10/287,180

(22) Filed: Nov. 4, 2002

(65) Prior Publication Data

US 2003/0064613 A1 Apr. 3, 2003

Related U.S. Application Data

(62) Division of application No. 09/970,072, filed on Oct. 3, 2001, now Pat. No. 6,497,583.

(51) Int. Cl.[7] ........................ B29C 39/10; B29C 70/88; B29C 71/04; B29C 35/08

(52) U.S. Cl. ....................... 264/429; 264/435; 264/437; 264/104; 264/108; 264/267

(58) Field of Search ................................ 264/429, 435, 264/437, 104, 105, 108, 128, 134, 135, 259, 267, 261, 263, 272.11; 439/86, 91, 71

(56) References Cited

U.S. PATENT DOCUMENTS

| | | | | | |
|---|---|---|---|---|---|
| 4,654,754 | A | * | 3/1987 | Daszkowski | 361/708 |
| 4,737,112 | A | * | 4/1988 | Jin et al. | 439/66 |
| 4,838,347 | A | * | 6/1989 | Dentini et al. | 165/185 |
| 5,045,249 | A | * | 9/1991 | Jin et al. | 264/437 |
| 5,585,282 | A | * | 12/1996 | Wood et al. | 438/613 |
| 5,735,698 | A | * | 4/1998 | Bakker et al. | 439/91 |
| 5,745,346 | A | * | 4/1998 | Ogawa et al. | 361/769 |
| 6,149,857 | A | * | 11/2000 | McArdle et al. | 264/429 |
| 6,168,442 | B1 | * | 1/2001 | Naoi | 439/91 |
| 6,190,509 | B1 | * | 2/2001 | Haba | 204/164 |
| 6,352,435 | B1 | * | 3/2002 | Perino et al. | 439/73 |
| 6,497,583 | B1 | * | 12/2002 | Weiss et al. | 439/91 |

FOREIGN PATENT DOCUMENTS

WO WO 02/103848 A2 * 12/2002

* cited by examiner

*Primary Examiner*—Angela Ortiz
(74) *Attorney, Agent, or Firm*—Brian M. Dingman, Esq.; Mirick, O'Connell, DeMallie & Lougee, LLP

(57) ABSTRACT

A method of forming an interconnection component with integral conductive elastomeric sheet material, comprising providing a connector frame defining an opening, casting uncured elastomeric conductive polymer interface (ECPI) material onto the connector frame spanning the opening, and curing the ECPI in the presence of a magnetic field, to integrally couple the ECPI to the connector frame, and create a series of spaced conductive columns through the ECPI thickness.

16 Claims, 8 Drawing Sheets

METHOD OF MANUFACTURING INTERCONNECTION COMPONENTS WITH INTEGRAL CONDUCTIVE ELASTOMERIC SHEET MATERIAL

CROSS-REFERENCE TO RELATED APPLICATION

This application is a divisional of "Interconnection Components With Integral Conductive Elastomeric Sheet Material, and Method of Manufacturing Same", Ser. No. 09/970,072, filed Oct. 3, 2001 now U.S. pat. No. 6,497,583.

FIELD OF THE INVENTION

This invention relates to the field of electrical connectors made with conductive polymer material.

BACKGROUND OF THE INVENTION

Elastomeric Conductive Polymer Interconnect (ECPI) is a composite of conductive metal particles in an elastomeric matrix that is constructed such that it conducts along one axis only. In general, this type of material is made to conduct through its thickness. ECPI is generally produced by mixing magnetic particles with a liquid resin, forming the mix into a continuous sheet, and curing the sheet in the presence of a magnetic field. This results in the particles forming columns through the sheet thickness. These columns are electrically conductive, creating anisotropic conductivity. The sheets are subsequently cut to the desired shape and attached to a frame or connector structure by mechanical means, or by the application of adhesive. In some cases, the cut ECPI is simply placed inside the interconnect structure. These methods of ECPI use result in material waste, require assembly labor, and can provide less than optimum performance.

As an illustrative example, consider the prior art assembly method for a surface mounted LGA or BGA connector. The connector consists of an alignment frame and a piece of ECPI material. The ECPI may be attached to the alignment frame either by mechanical means or by an adhesive. In some applications the ECPI can be placed loosely on a printed circuit board, and compressed in place between the device and the board. This is acceptable in some applications such as burn-in and test, but not for most OEM applications.

SUMMARY OF THE INVENTION

It is therefore an object of this invention to provide an interconnection component with an integral ECPI.

It is a further object of this invention to provide such a component that minimizes ECPI material waste.

It is a further object of this invention to provide such a component that requires less assembly labor.

It is a further object of this invention to provide such a component that enhances the interconnected performance of the ECPI.

This invention features an interconnection component with integral conductive elastomeric sheet material, comprising a connector frame, and an elastomeric conductive polymer interface (ECPI) integrally coupled to the connector frame. The integral coupling may be enhanced with one or more openings in the frame, in which the ECPI is held. The frame may be annular, and the openings along at least two opposed sides of the frame. The frame may be generally rectangular and the openings along all four sides of the frame.

The interconnection component may further comprise one or more protrusions in the ECPI, and in contact with the frame, to help to maintain registration between the interconnection component and the connected device. The ECPI may be in tension in the frame. The conductive columns in the ECPI may protrude from at least one surface of the ECPI. The ECPI may define one or more depressions proximate at least some of the conductive columns. The interconnection component may further comprise one or more spacer members between one or more portions of the frame, and the ECPI.

The interconnection component may further comprise a flex circuit interconnect in electrical contact with the ECPI, to enhance interconnection of a device to the ECPI. The interconnection component may still further comprise a series of electrical interconnects on the ECPI surface and in electrical contact with the conductive columns.

This invention also features a method of forming an interconnection component with integral conductive elastomeric sheet material, comprising providing a connector frame, casting uncured elastomeric conductive polymer interface (ECPI) material onto the connector frame, and curing the ECPI, to integrally couple the ECPI to the connector frame.

The method may further comprise providing a casting plate defining an annular cavity with a central pedestal, and placing the frame into the cavity before casting the uncured ECPI. The method may still further comprise providing one or more openings in the frame, in which the ECPI is held. The conductive columns in the ECPI may protrude from at least one surface of the ECPI. The protrusion may be created with a material that is liquid at the ECPI casting temperature, and placed between the pedestal and the uncured ECPI.

The method may still further comprise providing an array of high permeability zones in the central pedestal to focus the magnetic field such that the columns of particles are preferentially positioned in the area of the electrical interconnection.

BRIEF DESCRIPTION OF THE DRAWINGS

Other objects, features and advantages will occur to those skilled in the art from the following description of the preferred embodiments of the invention, and the accompanying drawings, in which.

DETAILED DESCRIPTION OF THE PREFERRED EMBODIMENTS

The invention described herein addresses the issues described above. It also makes it possible to add features to the ECPI that could not be readily done by other manufacturing methods. The present invention integrates the ECPI sheet formation process with the connector assembly process.

Figure 1B:
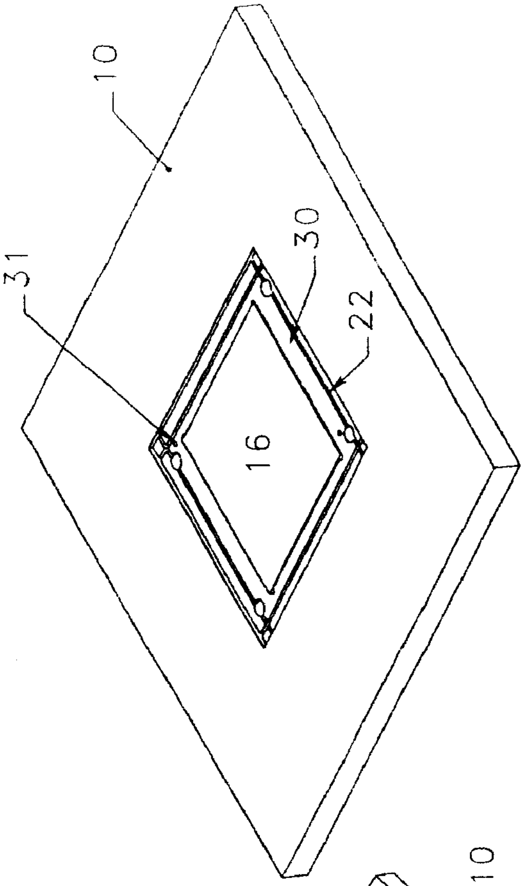
FIG. 1B shows an alignment frame for this invention placed in the casting plate of FIG. 1A.
Figure 1A:
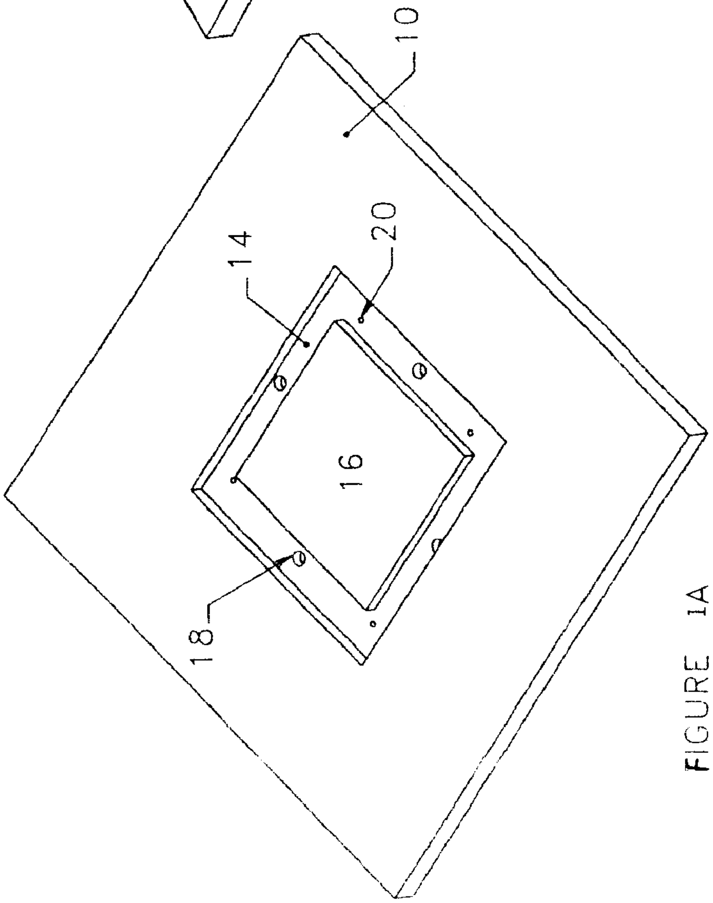
FIG. 1A is a perspective view of a casting plate for use in this invention.
Figure 1C:
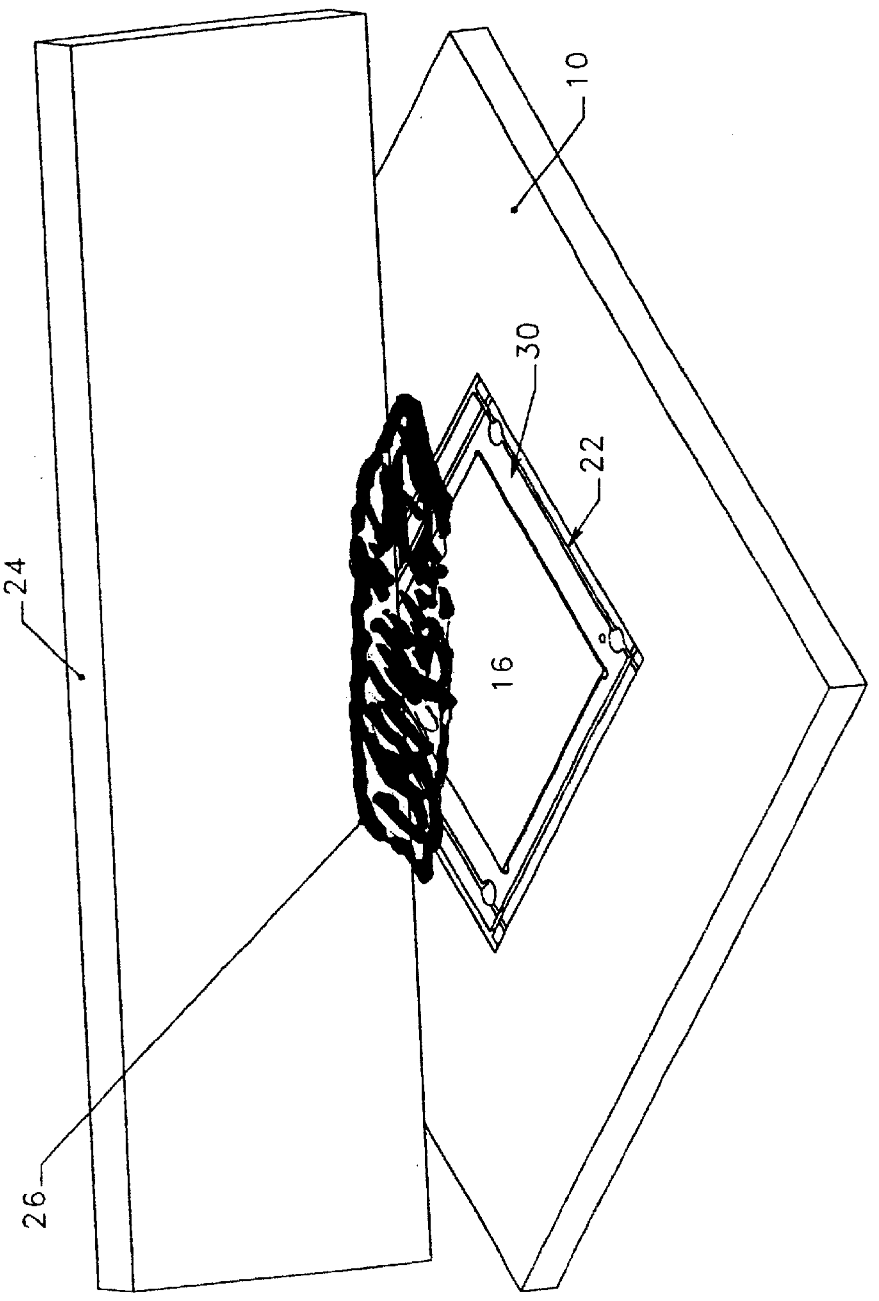
FIG. 1C schematically depicts uncured ECPI material being spread over the assembly of FIG. 1B.

With the invention, the connector is made by direct casting of the conductive elastomer onto a suitably-shaped frame, using a casting plate. FIG. 1 shows casting plate 10 for use in this invention. Plate 10 defines cavity 14 and central pedestal 16. Openings 18 and 20 pass through to the other face (not shown) of casting plate 10. Alignment frame 30 is placed in cavity 14 as shown in FIG. 1B. Alignment frame 30 carries openings 22 that are shown in more detail below. The top of pedestal 16 and alignment frame 30 is below the surface of casting plate 10. A sufficient amount of uncured elastomer and blended conductive particles that together comprise ECPI mixture 26 is poured onto the casting plate 10 and spread with squeegee or doctor blade 24 to create a film with a thickness defined by the difference in height between pedestal 16 and frame 30, and the upper surface of casting plate 10. Some of the material flows into openings 22 in frame 30, to lock the film to the frame, and thus register the film to the frame. Before the polymer cures, the entire assembly is placed in a magnet and oven to both align the particles and cure the ECPI. After the ECPI has cured, the assembled part comprising frame 30 with cured ECPI material spanning the central opening in the frame, is then ejected from the assembly using ejection holes 18.

The elastomer is cured at a temperature well above room temperature. As the elastomer cools to room temperature, it will shrink in volume due to its thermal coefficient of expansion. The sheet, however, is confined at its edges by the alignment frame. The connector frame has a lower coefficient of thermal expansion than the elastomer. The elastomer will bond to the frame and retention features in the frame as it cures. When the assembly cools, the ECPI shrinks faster than the frame, thus leaving the ECPI in tension. The ECPI sheet contains many vertically rigid columns. The tension causes the interstitial elastomer to substantially contract vertically as it is pulled laterally, due to its relatively high Poisson's ratio v. This will result in a close to optimum positioning of the columns of conductive particles.

Frame 30 has tooling features (openings 31) that allow frame 30 to be precisely aligned to mold 10 and its associated pedestal 16. Openings 20 in cavity 14 are examples of such tooling features in the casting plate. Registration pins (not shown) passing through openings 31 and 20 accomplish the alignment. Pedestal 16 defines the surface that controllably locates the inner face of the ECPI mixture during the casting process. This enables features to be molded into the ECPI which are accurately located to the connector frame. Several applications of this enabling concept are described below.

The figures indicate a single connector manufacturing system for illustrative purposes. In production, multiple connectors will be built simultaneously in a tool, providing a low cost, highly efficient manufacturing process.

Figure 2A:
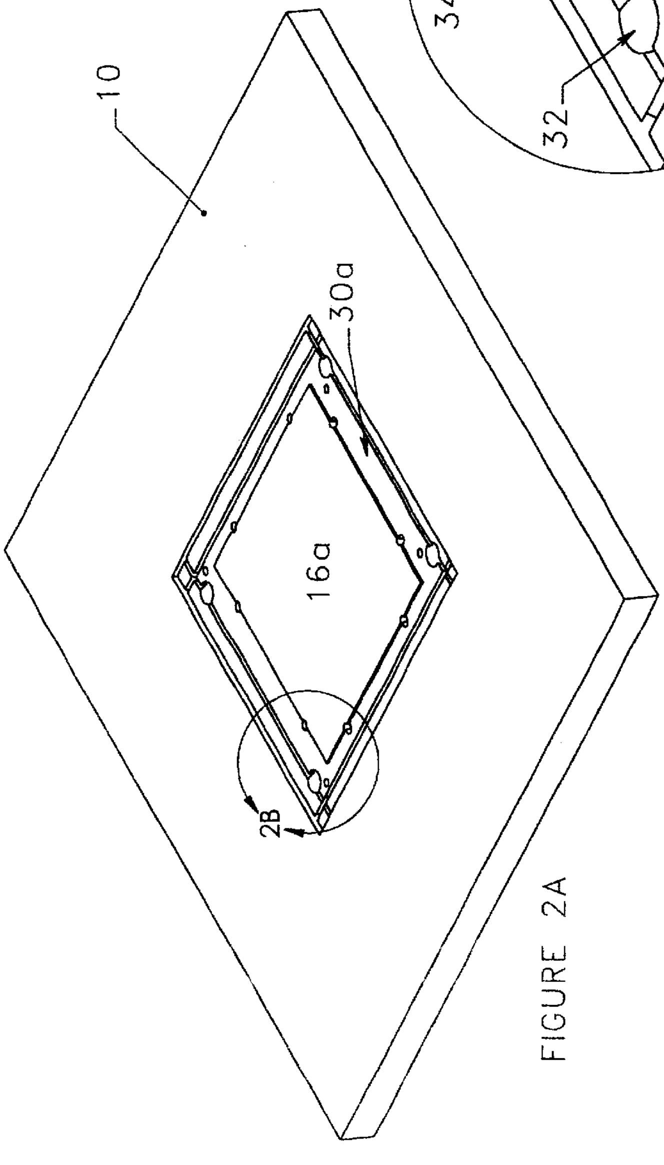
FIG. 2A depicts an alternative alignment frame for use in this invention in place in a casting plate, with FIG. 2B showing in enlarged detail a portion of that frame.
Figure 2B:
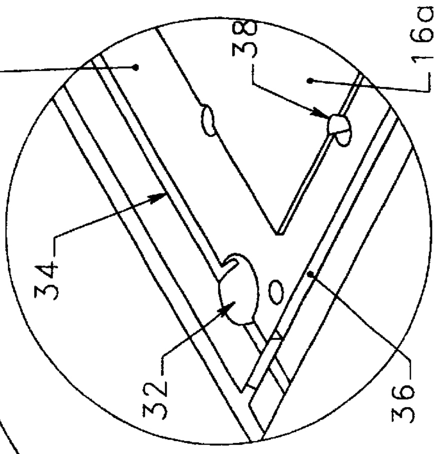
FIG. 2C depicts the frame of FIG. 2A with the cast, cured ECPI material thereon.
Figure 2C:
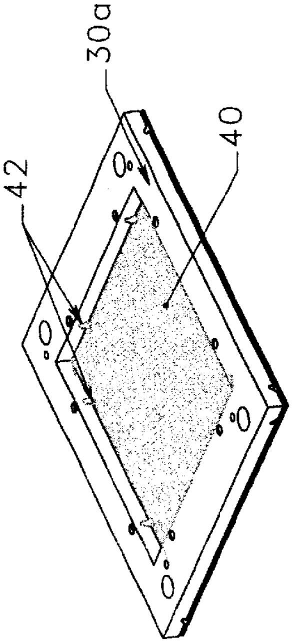

Additional features can be incorporated into the invention to better address the functionality of the connector. For example, it is possible to introduce elastomeric device package centering bosses 42 (FIG. 2) into alignment frame 30*a* during the casting process. This is accomplished by creating voids 38 in alignment frame 30*a* and pedestal 16*a*, as indicated in FIG. 2. As the elastomer is squeegeed into the plate it will fill these voids, creating cast alignment bosses 42. This can be designed to optimally accommodate the full mechanical tolerance range of the device. It is also possible to mold or connect springs to the frame structure that will center the device in the connector frame. These centering springs could be accomplished with molded fingers around the inside perimeter of the frame, essentially where bosses 42 would be. These fingers would bias the device inserted into the frame to properly locate the frame/ECPI and component.

Figure 3B:
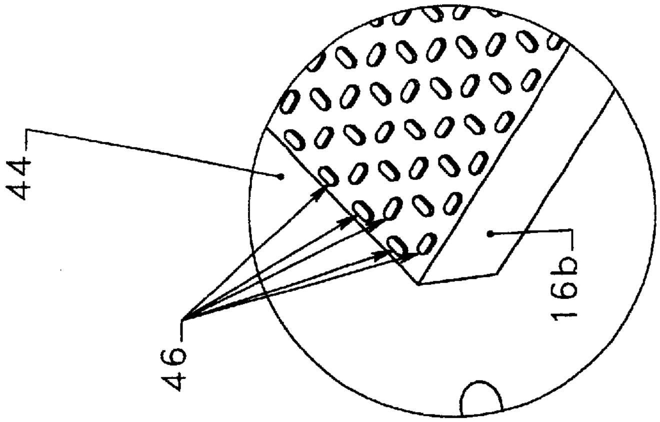
FIG. 3A depicts an alternative embodiment of the central pedestal for the casting plate for this invention, with FIG. 3B showing in enlarged detail a portion of that casting plate.
Figure 3A:
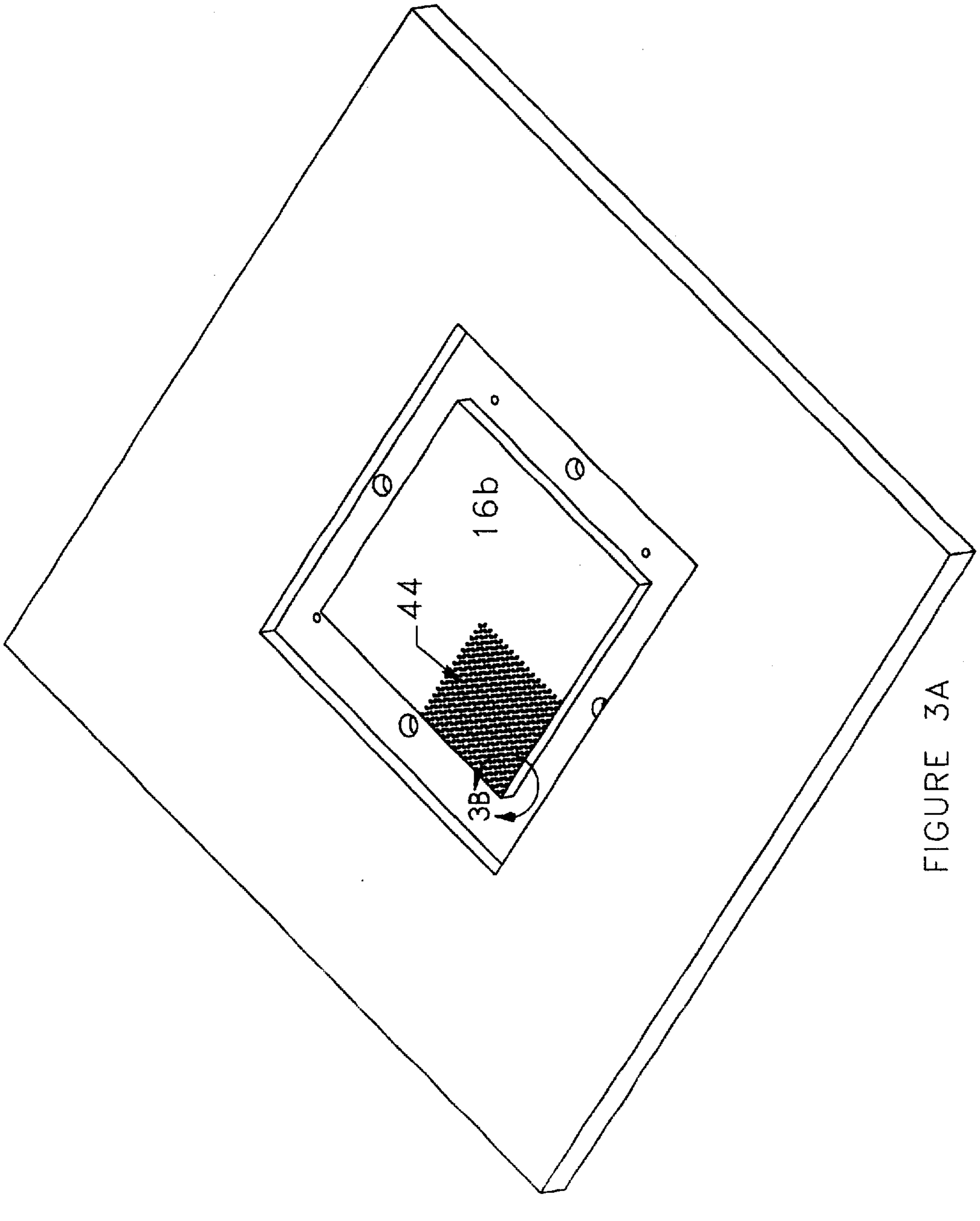

The surface of the pedestal in the alignment plate is replicated by the surface of the elastomer during the casting process. Features which will enhance the performance of the elastomer can be formed on the pedestal, and these will be replicated in the surface of the elastomer. One example of such a feature is shown in FIG. 3, where a series 44 of spaced protrusions 46 have been placed on pedestal 16*b* on a grid which matches the interstitial spaces of the pad array of the device being connected with the ECPI. This will result in an array of dimples in the elastomer, which will both allow for expansion volume of the elastomer, and potentially reduce the opportunity for electrical shorts between adjacent contacts. Protrusions 46 can be applied to pedestal 16*b* by machining methods, or by the application of a photo definable medium such as solder mask.

The central pedestal of the casting plate can be coated with a mold release that is solid at room temperature, but a liquid at oven temperature. This will melt before the ECPI is cured, creating a liquid film between the ECPI and the pedestal. This allows the conductive columns magnetically forming from the particles in the ECPI to protrude downwards into the liquid film (as well as upwards). The result is that the columns protrude slightly from the surface of the cured ECPI sheet. Also, since the bottom particles of the column are in a liquid film, the lateral mobility of the columns is increased, thus enhancing their ability to uniformly distribute by mutual repulsion, thinning out high density anomalies and back-filling into any sparse areas.

Figure 4:
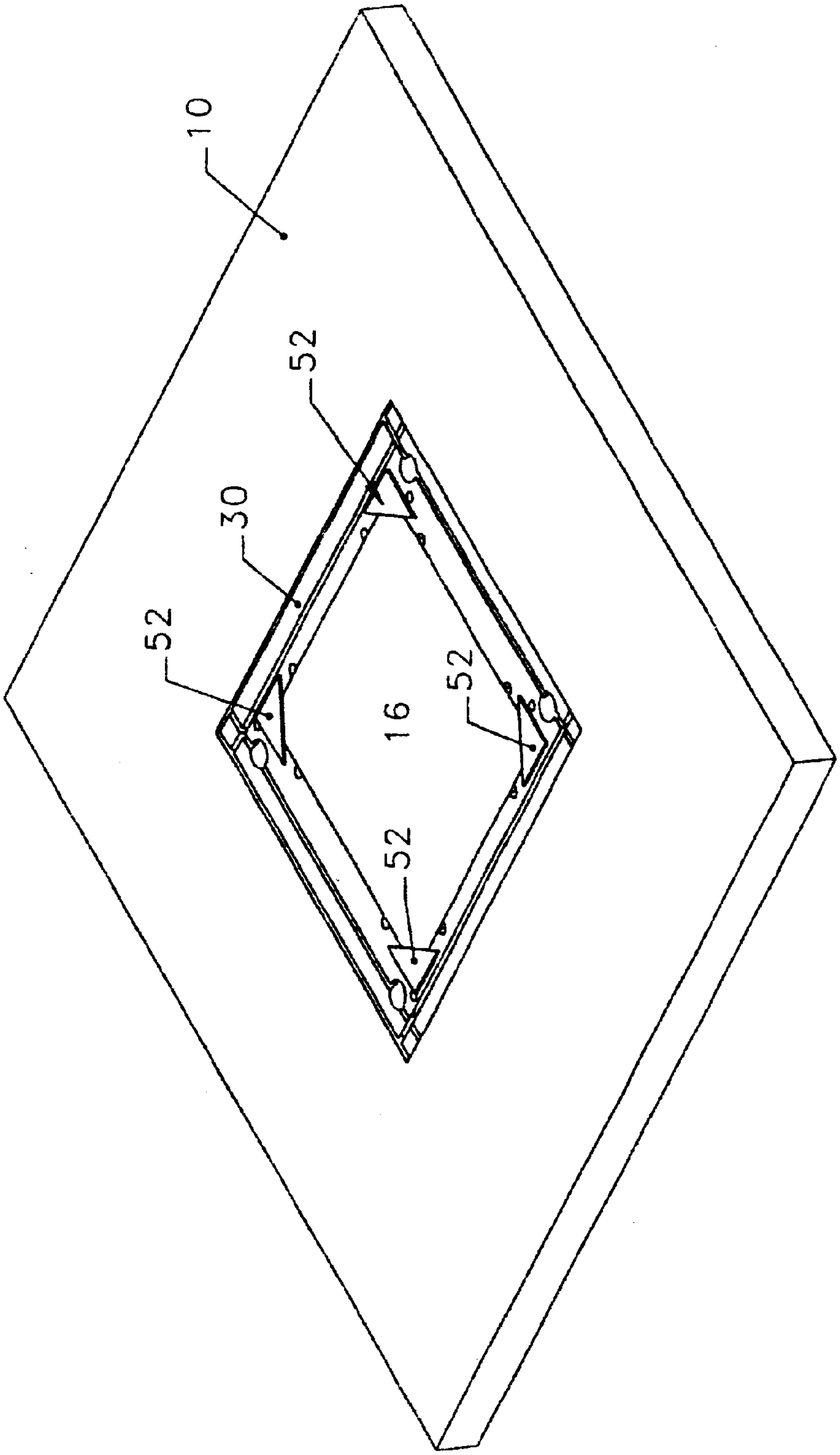
FIG. 4 depicts the use of spacer structures on the frame before the ECPI is cast.
Figure 5D:
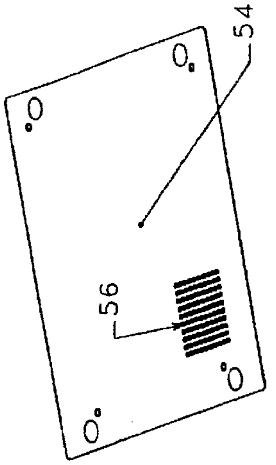
FIGS. 5A through 5D depict another alternative for the invention in which a flex circuit is used in the assembly.
Figure 5B:
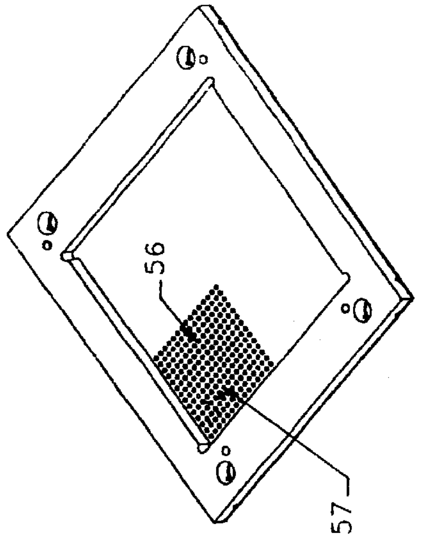
Figure 5C:
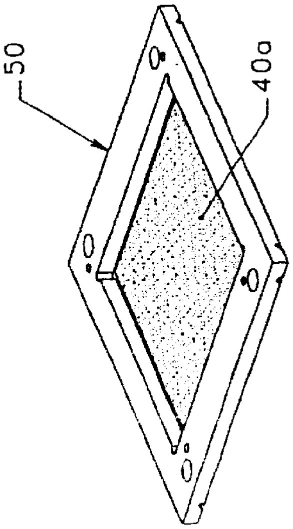
Figure 5A:
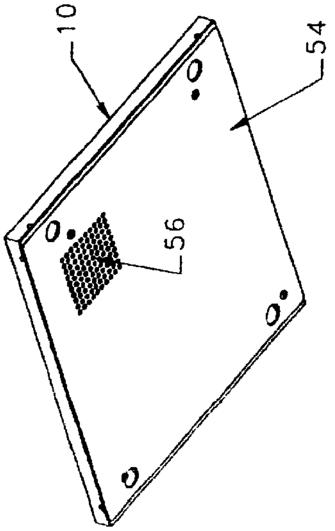

It is also possible to incorporate spacer structures into the connector frame, for example as rigid corner spacers 52, FIG. 4. Spacers 52 sit on the frame, between the ECPI and the frame. Accordingly, spacers 52 will limit the compression of the elastomer to a fixed compressed thickness. Also, inertial forces caused by shock and vibration of the heat sink and device will be transmitted directly from the device to the substrate (frame), thus isolating the elastomer and its electrical interconnections.

Figure 6B:
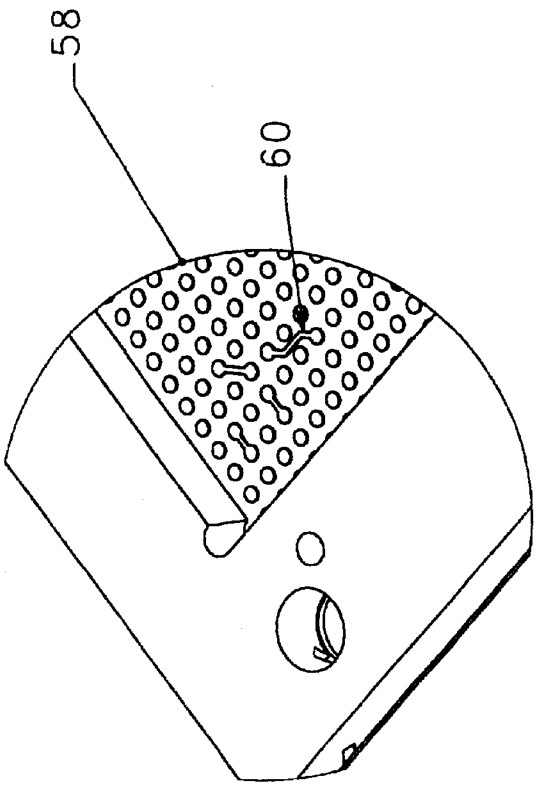
FIG. 6A depicts an alternative to the flex circuit of FIG. 5 wherein contacts are directly plated on the ECPI, with FIG. 6B showing in enlarged detail a portion of the plated ECPI surface.
Figure 6A:
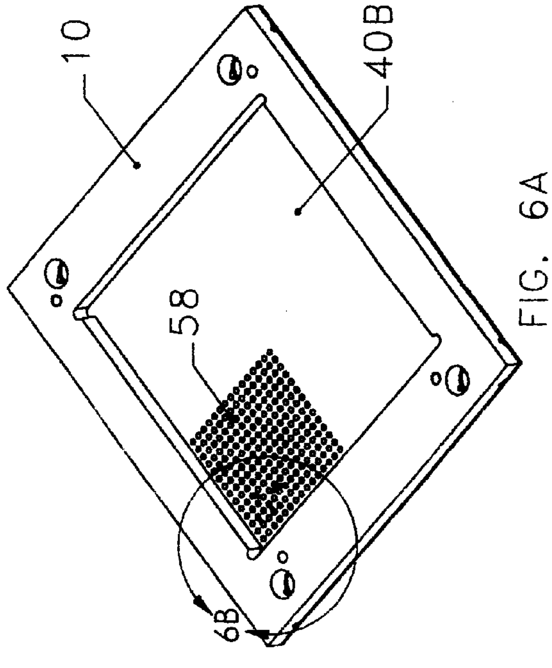

In another preferred embodiment, a flex circuit 54 can be placed in the system as shown in FIG. 5. Flex circuit 54 can be mounted on the device side, as shown in the figure, or on the board side of the cast elastomer. Flex circuit 54 has pads 56 on both sides, interconnected by metalized vias. Pads 56 could be isolated from each other, or interconnected with circuits 57, which are similar to circuits 60, FIG. 6. The latter would be useful in providing a means to modify the device interconnect without going through the expense of rebuilding the device.

The flex circuit interposed in this fashion provides several unique enhancements to the design. It provides a robust wear surface for applications requiring many insertion cycles. When used to interconnect BGA (Ball Grid Array) devices, the flex circuit interposer provides a means (properly shaped and sized pads) to optimally transfer the load from the spherical ball to the elastomer. The opposing pad surfaces of the flex can be sized and plated so as to optimize the interconnection. For example, the pad facing the BGA side could be solder plated. In another example, the pad facing the device could be smaller than the device pad to better accommodate tolerance mismatch issues between the device and board. The pads on the device side of the flex circuit interposer could have asperities formed on them such as silvered nickel particles, or plated diamond shards. These would bite through any oxides or debris on the device pad, enhancing the quality of electrical interconnection.

In another preferred embodiment either surface of the cast elastomer could be directly plated with the same interface pad structures described above in conjunction with FIG. 5. See FIG. 6, wherein pads 58 have been directly plated on ECPI 40*b*, and may included pad interconnecting circuits 60. Contacts 58 provide many of the same functions provided by the flex circuit described above. These pads provide a robust wear surface for applications requiring many insertion cycles.

When used to interconnect BGA (Ball Grid Array) devices, the plated pad provides a means to optimize load transfer from the spherical ball to the ECPI. The opposing pad surfaces on the ECPI can be sized and plated so as to optimize the interconnection. For example, the pad facing the BGA side could be solder plated. In another example, the pad facing the device could be smaller than the device pad to compensate for tolerance mismatch issues between the device and board. The pads on the device side of the ECPI could have asperities formed on them, such as the plated diamond shards. These would bite through any oxides or debris on the device pad, enhancing the quality of electrical interconnection.

Figure 7B:
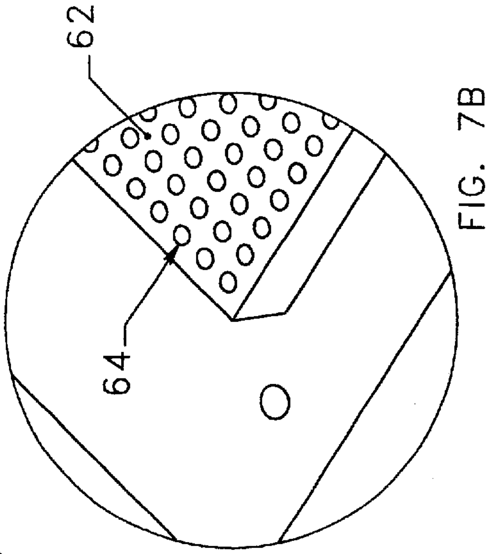
FIG. 7A depicts another alternative for the central pedestal of the casting plate for the invention, in which an array of zones of high magnetic permeability material are used, with FIG. 7B showing in enlarged detail a portion of the array of FIG. 7A.
Figure 7A:
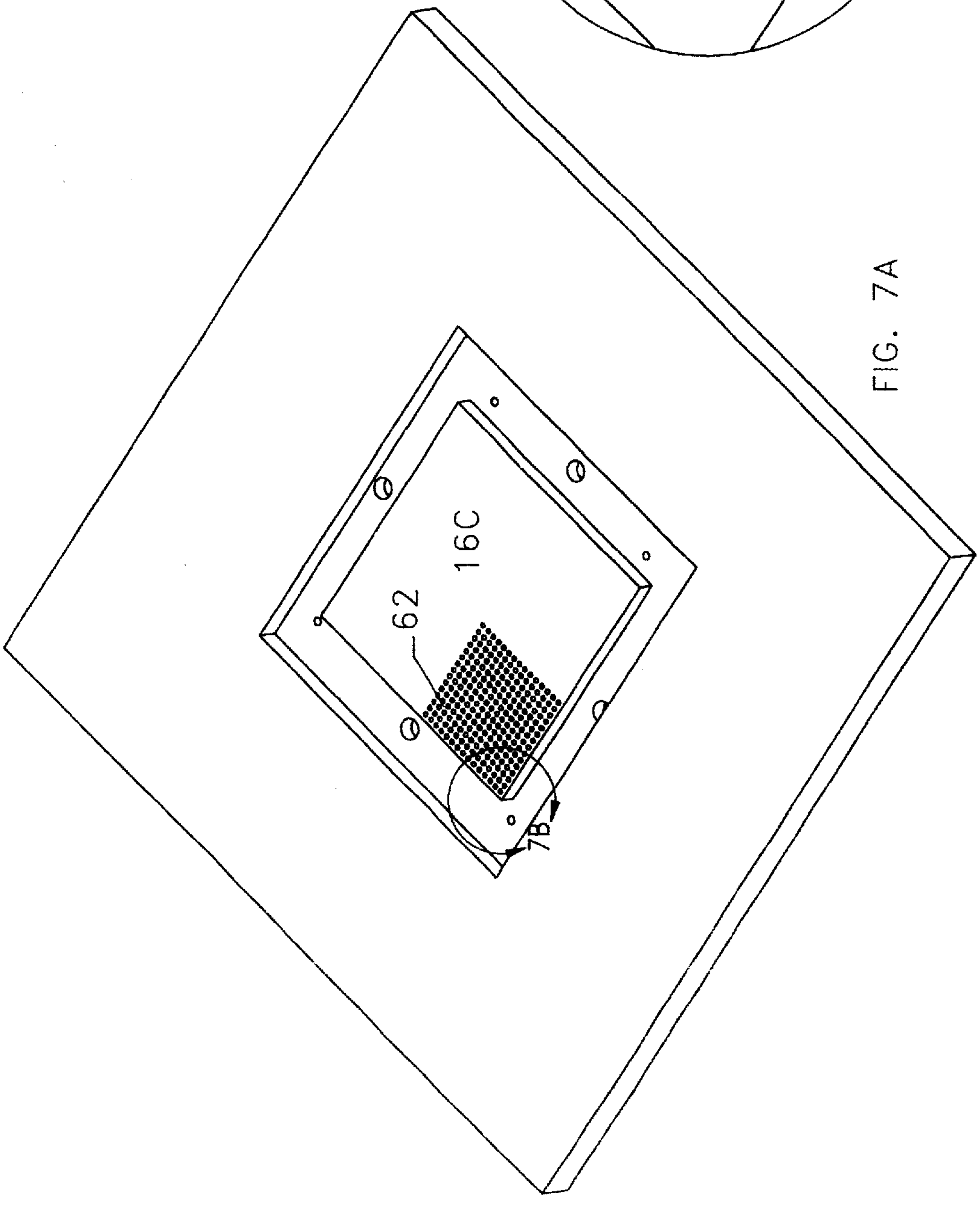

Pedestal 16*c*, FIG. 7, could incorporate an array 62 of zones 64 containing high magnetic permeability material, on the same grid as the device contacts. Zones 64 focus the magnetic field in the ECPI while it is being cured so that the conductive particle column density will be highest in the vicinity of an interconnect, and lowest in the space between contacts. This simultaneously increases the contact conductivity and the insulation resistance between neighboring contacts.

Other embodiments will occur to those skilled in the art and are within the following claims.

What is claimed is:

1. A method of forming an interconnection component with integral conductive elastomeric sheet material, comprising:

providing a connector frame defining an opening;

casting uncured elastomeric conductive polymer interface (ECPI) material onto the connector frame spanning the opening; and curing the ECPI in the presence of a magnetic field, to integrally couple the ECPI to the connector frame, and create a series of spaced conductive columns through the ECPI thickness.

2. The method of claim 1, wherein the frame has a lower coefficient of thermal expansion than the ECPI so that the ECPI is held in tension.

3. The method of claim 1, wherein the method further comprises:

providing a casting plate defining an annular cavity with a central pedestal, and placing the frame into the cavity before casting the uncured ECPI.

4. The method of claim 1, wherein the method further comprises providing one or more openings in the frame, in which the ECPI is held.

5. The method of claim 4, wherein the frame is annular, and the openings are along at least two opposed sides of the frame.

6. The method of claim 5, wherein the frame is generally rectangular, and the openings are along all four sides of the frame.

7. The method of claim 1, further comprising one or more protrusions in the ECPI, and in contact with the frame, to help to maintain registration between the interconnection component and a device.

8. The method of claim 1, wherein the ECPI is in tension in the frame.

9. The method of claim 1, wherein the conductive columns in the ECPI protrude from at least one surface of the ECPI.

10. The method of claim 9, wherein the protrusion is created with a material that is liquid at the ECPI casting temperature, and placed between the pedestal and the uncured ECPI.

11. The method of claim 1, wherein the ECPI defines one or more depressions proximate at least some of the conductive columns.

12. The method of claim 1, further comprising one or more spacer members between one or more portions of the frame, and the ECPI.

13. The method of claim 1, further comprising a flex circuit interconnect in electrical contact with the ECPI, to enhance interconnection of a device to the ECPI.

14. The method of claim 1, further comprising a series of electrical interconnects on the ECPI surface and in electrical contact with the conductive columns.

15. The method of claim 3, wherein the method further comprises providing an array of high permeability zones in the central pedestal to focus the magnetic field such that the columns of particles are preferentially positioned in the area of the electrical interconnection.

16. The method of claim 3, wherein the central pedestal defines one or more tooling features for creating molded features in the portion of the ECPI spanning the frame opening.

* * * * *